(12) United States Patent
Jamadagni et al.

(10) Patent No.: US 10,512,041 B2
(45) Date of Patent: *Dec. 17, 2019

(54) METHOD AND SYSTEM FOR MINIMIZING POWER CONSUMPTION OF USER EQUIPMENT DURING CELL DETECTION

(71) Applicant: Samsung Electronics Co., Ltd, Suwon-si (KR)

(72) Inventors: Satish Nanjunda Swamy Jamadagni, Bangalore (IN); Mangesh Abhimanyu Ingale, Bangalore (IN); Gert Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,596

(22) Filed: Aug. 13, 2018

(65) Prior Publication Data

US 2018/0352513 A1 Dec. 6, 2018

Related U.S. Application Data

(63) Continuation of application No. 14/403,137, filed as application No. PCT/KR2013/004480 on May 22, 2013, now Pat. No. 10,051,576.

(30) Foreign Application Priority Data

May 22, 2012 (IN) .......................... 2036/CHE/2012

(51) Int. Cl.
*H04W 52/02* (2009.01)
*H04W 48/16* (2009.01)

(52) U.S. Cl.
CPC ... *H04W 52/0235* (2013.01); *H04W 52/0229* (2013.01); *H04W 52/0254* (2013.01);
(Continued)

(58) Field of Classification Search
None
See application file for complete search history.

(56) References Cited

U.S. PATENT DOCUMENTS 9,271,174 B2 2/2016 Choi
10,051,576 B2 * 8/2018 Jamadagni ........ H04W 52/0229
(Continued)

FOREIGN PATENT DOCUMENTS

CN 102137410 A 7/2011
CN 102149093 A 8/2011
(Continued)

OTHER PUBLICATIONS

Extended European Search Report issued for EP 13794755.2 dated Dec. 4, 2015, 11 pgs.
(Continued)

*Primary Examiner* — Kouroush Mohebbi

(57) ABSTRACT

A method and system for minimizing the battery power consumption of user equipment (UE) during inter-frequency cell detection in a heterogeneous network is disclosed. A serving cell in the heterogeneous network provides a relaxed cell detection indication to the UE on a specified frequency for cell detection. The UE applies the relaxed cell detection for detecting the cells on the specified frequency. During inter-frequency cell detection on specified frequency, the UE discards some normal measurement gaps. The inter-frequency cell detection is delayed as compared to normal cell detection time requirement using the normal measurement gaps. The UE deactivates the relaxed detection indication, upon detecting the inter-frequency cell and performs the continuous RSRP and RSRQ measurements for detected inter-frequency cell using all the normal measurement gaps to meet normal measurement accuracy and measurement reporting requirement.

16 Claims, 4 Drawing Sheets

(52) U.S. Cl.
CPC .............. *H04W 48/16* (2013.01); *Y02D 70/00* (2018.01); *Y02D 70/1262* (2018.01); *Y02D 70/24* (2018.01)

(56) References Cited

U.S. PATENT DOCUMENTS

| | | |
|---|---|---|
| 2005/0260990 A1 | 11/2005 | Huang et al. |
| 2010/0061343 A1 | 3/2010 | Kazmi et al. |
| 2010/0323633 A1 | 12/2010 | Pani et al. |
| 2011/0105122 A1 | 5/2011 | Wu |
| 2012/0034917 A1 | 2/2012 | Kazmi |
| 2012/0115486 A1 | 5/2012 | Huang et al. |
| 2012/0207044 A1 | 8/2012 | Johansson et al. |
| 2012/0327797 A1 | 12/2012 | Siomina et al. |
| 2013/0040640 A1* | 2/2013 | Chen ................. H04W 36/0083 455/434 |
| 2013/0018851 A1 | 7/2013 | Jayaraman et al. |
| 2013/0308481 A1* | 11/2013 | Kazmi .................. H04W 48/16 370/252 |

FOREIGN PATENT DOCUMENTS

| | | | |
|---|---|---|---|
| KR | 10-2010-0030670 A | 3/2010 | |
| WO | 2011/163482 A1 | 12/2011 | |
| WO | 2012/044246 A1 | 4/2012 | |
| WO | WO -2012177203 A1 * | 12/2012 | ............ H04W 24/10 |
| WO | WO-2012177203 A1 * | 12/2012 | ............ H04W 24/10 |

OTHER PUBLICATIONS

ZTE, "Discussion on Enhancement of Small Cell Discovery", 3GPP TSG-RAN WG2 Meeting #75bis, dated Mar. 11, 2011, 3 pgs.
Huawei, "Small Cell Discovery in HetNet", 3GPP TSG-RAN WG2 Meeting #75bis, R2-115169, dated Oct. 4, 2011, 4 pgs.
Samsung, "Relaxed Cell Detection for Pico Cell Discovery", 3GPP TSG-RAN WG2 #78, R2-122575, dated May 15, 2012, 3 pgs.
International Search Report dated Jul. 31, 2013 in connection with International Patent Application No. PCT/KR2013/004480, 3 pages.
Written Opinion of International Searching Authority dated Jul. 31, 2013 in connection with International Patent Application No. PCT/KR2013/004480, 4 pages.
Chinese Office Action for Chinese Application No. 2013800377336, dated Aug. 1, 2017. (23 pages).
Intellectual Property India Examination Report dated Feb. 5, 2019 regarding Application No. 2036/CHE/2012, 6 pages.
Notice of Allowance in connection with Korean Patent Application No. 10-2014-7032800, 5 pages.

* cited by examiner

| DRX cycle length (s) | $T_{\text{basic\_iden}}$ (s) [DRX cycles] | |
|---|---|---|
| | Gap period = 40 ms | Gap period = 80 ms |
| Non-DRX/ ≤ 0.16 | 0.480·8 ≈ 3.8s | 0.480·16 ≈ 7.68s |
| 0.256 | 5.12·$N_{freq}$ (20·$N_{freq}$) | 7.68·$N_{freq}$ (30·$N_{freq}$) |
| 0.32 | 6.4·$N_{freq}$ (20·$N_{freq}$) | 7.68·$N_{freq}$ (24·$N_{freq}$) |
| 0.32< DRX-cycle ≤ 2.56 | Note(20·$N_{freq}$) | Note(20·$N_{freq}$) |
| Note: Time depends upon the DRX cycle in use | | |

METHOD AND SYSTEM FOR MINIMIZING POWER CONSUMPTION OF USER EQUIPMENT DURING CELL DETECTION

CROSS-REFERENCE TO RELATED APPLICATIONS AND CLAIM OF PRIORITY

This application is a continuation of U.S. patent application Ser. No. 14/403,137 filed on Nov. 21, 2014, which is a 371 of International Patent Application No. PCT/KR2013/004480 filed on May 22, 2013, which claims priority to India Patent Application No. 2036/CHE/2012 filed on May 22, 2012, the disclosures of which are herein incorporated by reference in their entirety.

BACKGROUND

The present invention relates to heterogeneous networks and more particularly relates to a method and system for minimizing the battery power consumption of user Equipment (UE) during inter-frequency cell discovery in heterogeneous network deployments.

1. Field

In a wireless communication system, ubiquitous coverage is the prime requirement for a cellular operator. In a homogeneous deployment, there will be uniform cell size or coverage area, whereas in case of a heterogeneous network (HetNet) the cell sizes vary according to the deployment of different types of cells. A HetNet deployment topology comprises mixed cells served by high power macro eNodeBs (eNBs) and low power pico or Femto eNBs or relay nodes within a geographical area.

2. Description of Related Art

In the LTE system, an evolved universal terrestrial radio access network (E-UTRAN) includes a plurality of evolved Node-Bs (eNBs) and communicates with a plurality of mobile stations, also referred as User Equipment's (UEs).

In the LTE system, the user equipment (UE) may perform measurements to measure radio link quality, such as quality of a frequency channel or strength of a radio signal, in order to facilitate handover due to mobility of the UE. The measurement can be divided into two types according to the current operating frequency of the UE, which are an intra-frequency measurement and an inter-frequency/inter-RAT measurement.

The intra-frequency measurement is predominantly performed for the mobility within the same frequency channel (between cells operating on the same carrier frequency); whereas the inter-frequency/inter-Radio Access Technology (RAT) measurement is predominantly performed for the mobility between different frequency channels (i.e. between cells operating on different carrier frequencies).

In addition, the inter-frequency/inter-RAT measurement is performed during measurement gap configured by the network. Further, during the measurement gap, both the uplink and downlink transmissions are suspended (for example, no Physical Uplink Control Channel (PUCCH), physical uplink shared channel (PUSCH), physical downlink control channel (PDCCH), and physical downlink shared channel (PDSCH) transmissions), and thereby the inter-frequency/inter-RAT measurement can be performed within the measurement gap.

Inter-frequency neighbor cell search (measurement) is performed within a gap length of 6 ms in LTE for both Time Domain Duplex (TDD) and Frequency Domain Duplex (FDD) systems. However, some time is required for switching between the frequency of serving cell and the frequency on which a new cell need to be detected. The remaining time of the gap (slightly less than 6 ms) can be utilized for neighbor cell search on one or more configured frequencies, other than the serving frequency. Hence within one gap duration, the actual time for neighbor cell search will be less than 6 ms.

Wireless network operators for maximizing cell area throughput, typically deploy a layer of small cells (called as pico cells) over the under laid macro cell deployment on a frequency other than the frequency of macro layer. This improves the possible offloading opportunity for UEs to be served by pico layer with better quality of service (QoS). When the pico layer is on the same frequency as macro cell layer, then it is called co-channel HetNet deployment. The disclosed invention is in the context of inter-frequency HetNet deployment where the frequency of pico cells is different from the frequency of under laid macro cells.

The inter-frequency HetNet deployment may be asynchronous such that radio frame timing of one cell is not aligned with that of the other neighbor cell(s). The measurement gap is standardized in the LTE specification (TS 36.331) and has a periodicity of either 40 ms or 80 ms.

The currently defined gap pattern was originally designed for mobility of users within a macro cell only deployment scenario for the purpose of coverage as compared to the HetNet deployments where the purpose is offloading opportunity. The measurement gap is designed and optimized for allowing fast inter-frequency/RAT cell search and enabling fast mobility, when needed in a macro cell only deployment scenario.

Further, in a HetNet scenario where small cells are deployed for the purpose of offloading users from macro cell, the constant use of inter-frequency measurements using the current standardized measurement gap patterns and measurement rules will drain the UE battery rapidly.

In the light of above discussion, it is desirable to have a method and system that provides a mechanism for minimizing the battery power consumption of UE during the inter-frequency cell discovery but at the same time not compromising any possible offloading opportunity in HetNet deployments.

SUMMARY

The principal object of the embodiments herein is to provide a method and system for minimizing battery power consumption of user equipment (UE) during inter-frequency cell detection in heterogeneous networks.

Another object of the invention is to provide a method for relaxed cell detection by the UE during inter-frequency cell detection in heterogeneous networks.

Accordingly the invention provides a method for minimizing battery power consumption of a user equipment (UE) in Radio Resource Control (RRC) connected mode for cell detection in a heterogeneous network, wherein the method comprises deciding to send a relaxed cell detection indication for a specified frequency among plurality of frequencies to the UE for the cell detection, by a serving cell based on at least one parameter. The method further comprises receiving the relaxed cell detection indication for the specified frequency by the UE to initiate the cell detection on the specified frequency. Further the method comprises applying relaxed cell detection requirement using normal measurement gaps by the UE for detecting at least one cell on the specified frequency, upon receiving the relaxed detection indication from the serving cell.

Accordingly the invention provides a heterogeneous network for minimizing battery power consumption of a user equipment (UE) in Radio Resource Control (RRC) connected mode for cell detection, wherein the network is configured to decide for sending a relaxed cell detection indication for a specified frequency among plurality of frequencies to the UE for the cell detection based on at least one parameter.

Accordingly the invention provides a user equipment (UE) for inter-frequency cell detection in Radio Resource Control (RRC) connected mode in a heterogeneous network, wherein the UE comprises an integrated circuit. Further the integrated circuit comprises at least one processor and at least one memory. The memory comprises a computer program code within the integrated circuit. At least one memory and the computer program code with the at least one processor cause the UE to receive a relaxed cell detection indication for a specified frequency to initiate the cell detection on the specified frequency from a serving cell, wherein the specified frequency is a frequency other than the specified frequency. The UE is further configured to apply a relaxed cell detection requirement using normal measurement gaps for detecting at least one cell on the specified frequency, upon receiving the relaxed detection indication from the serving cell.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The principal effect of the embodiments herein is to provide a method and system for minimizing battery power consumption of user equipment (UE) during inter-frequency cell detection in heterogeneous networks.

Another effect of the invention is to provide a method for relaxed cell detection by the UE during inter-frequency cell detection in heterogeneous networks.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
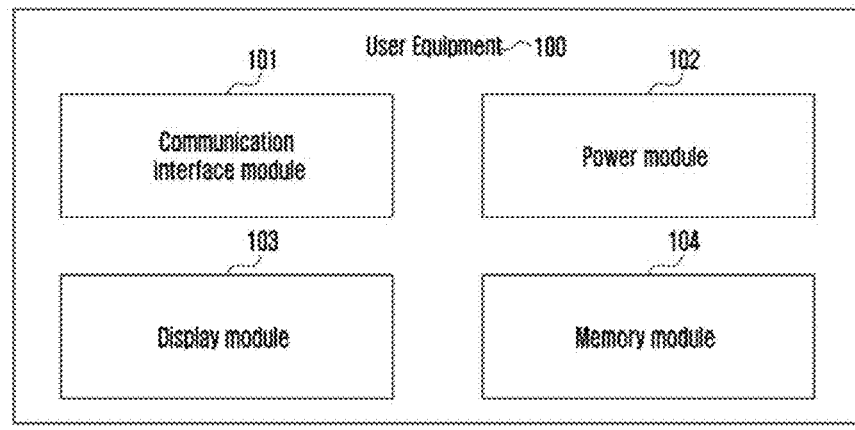
FIG. 1 illustrates a block diagram of a user equipment (UE) with various modules, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments disclosed herein achieve a method and system for minimizing the battery power consumption of user equipment (UE) during inter-frequency cell detection. A serving cell in a heterogeneous network provides a relaxed cell detection indication to the UE on a specified frequency for cell detection. The serving cell is the cell with which the UE is having data exchange in Radio Resource Control (RRC) connected state. The UE after receiving the relaxed cell detection indication from the serving cell, applies the relaxed cell detection for detecting the inter-frequency cells on the specified frequency provided by the serving cell.

Further, the serving cell in the heterogeneous network decides to send the relaxed cell detection indication to the UE based on the load conditions in the serving cell, and Quality of Service (QoS).

In an embodiment, when the load in the serving cell is not a consideration for offloading, then the serving cell may not publish the relaxed detection indication in the system information message and may configure short periodicity gap pattern for measuring pico cells to the UE.

In an embodiment, the serving cell can publish the relaxed detection indication to be applicable to the UEs which belong to one or more access classes.

In an embodiment, the serving cell can indicate the relaxed detection indication in the access class barring or in an enhanced access class barring message so that the relaxed detection is applied by the UEs belonging to only to a particular access class.

Further, when the load in the serving cell is not a consideration, the serving cell can provide a relaxed measurement indication in the system information message (SI) to the UEs.

The serving cell provides the relaxed detection indication along with the offset or threshold in the SI message or in any broadcast message.

In an embodiment, the serving cell can indicate the signal strength offset or the threshold criteria, which needs to be satisfied by the pico cell for detection by the UE.

In an embodiment, the serving cell can indicate that the relaxed detection is not applicable in a cell by indicating the status of the relaxed detection indication to false or the serving cell can use a bit to indicate the applicability of the "relaxed measurement indication" flag.

Further, when the QoS is a consideration for offloading, the pico cell can be detected in a relaxed manner, but the pico cell should have the threshold or offset which is better than that of the serving cell.

In an embodiment, the UE receives the relaxed cell detection indication in dedicated message or in the SI message.

In an embodiment, the inter-frequency cell detection is delayed as compared to normal cell detection time requirement using the normal measurement gaps, hence relaxing the cell detection time requirement.

The serving cell in the heterogeneous network configures the relaxation in cell identification time. The cell identification time (configured by the serving cell), defines the delay or relaxation by the UE which is expected to detect the inter-frequency cell. During inter-frequency cell detection on specified frequency, the UE discards some normal measurement gaps configured thus saving battery power.

Throughout the description, the term delay in cell detection or relaxation of cell detection time is used interchangeably.

Further, the UE performs the discrete scanning for detecting the inter-frequency cell using the normal configured measurement gaps by discarding some measurement gaps and therefore, delay in identification of cell on frequency for which relaxed cell detection is indicated.

The UE deactivates the relaxed cell detection indication, upon detecting the inter-frequency cell on the specified frequency in the relaxed time duration.

Further, the UE performs continuous measurements of Reference Signal Received Power (RSRP) and Reference Signal Received Quality (RSRQ) of the detected inter-frequency cell using all the normal measurement gaps to facilitate offloading to the detected inter-frequency cell.

In another embodiment, the relaxed cell detection indication for the specified frequency is provided to the UE along with discrete measurement parameters which includes but not limited to measurement period and measurement interval.

In an embodiment, the UE performs the continuous scanning for inter-frequency cells using the normal measurement gaps during the start time of the measurement interval and within the measurement period as provided by the serving cell.

The UE discards the normal measurement gaps for scanning inter-frequency cells on the specified frequency, after expiry of the measurement period in the measurement interval. Further, the UE repeats the continuous scanning for cell detection on the specified frequency during the measurement period in the next measurement interval until an inter-frequency cell is detected on the specified frequency. With the discrete measurement parameters, the UE is able to relax the cell detection time requirement for the cells on the specified frequency and hence able to minimize battery power consumption.

In an embodiment the UE can be a mobile phone, smart phone, tablet or any other electronic gadget that can communicate with a wireless cellular network.

Referring now to the drawings, and more particularly to FIGS. 1 through 8, where similar reference characters denote corresponding features consistently throughout the figures, there are shown preferred embodiments.

FIG. 1 illustrates a block diagram of user equipment (UE) with various modules, according to embodiments as disclosed herein. As depicted in the figure, the UE 100 comprises a communication interface module 101, a power module 102, a display module 103 and a memory module 104. The communication interface module 101 helps the UE 100 to connect to the radio access network. The power module 102 holds the battery information and status of battery power in the user equipment 100. The battery information comprises the amount of charge that the UE 100 possess and the time period for which the UE 100 will be in operation and so on. The display module 103 of the UE 100 comprises of a user interface which can be a key pad or through any other means by which a user can input some data into the UE 100. The memory module 104 may include a random access memory (RAM) or another type of dynamic storage device that may store information and instructions, for example an application, for execution by processor, a read-only memory (ROM) device or another type of static storage device.

Figure 2:
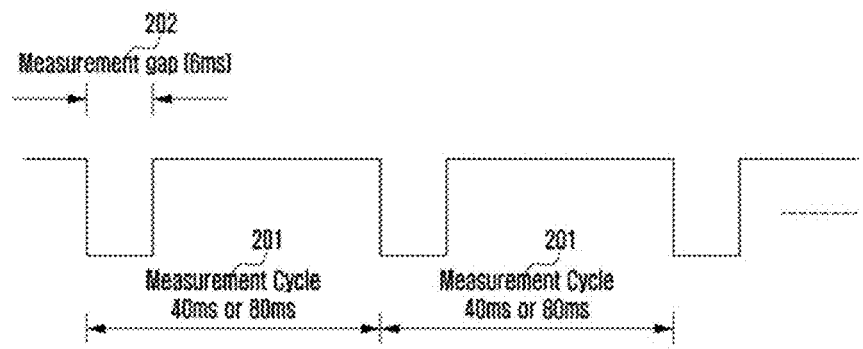
FIG. 2 illustrates a measurement gap pattern for inter-frequency measurements by the UE in the existing art.

FIG. 2 illustrates a measurement gap pattern for inter-frequency measurements by the UE in the existing art. In HetNet, the inter-frequency pico cells may be deployed within the coverage of macro cells to provide offloading opportunities in dense hotspot scenarios like shopping malls, train stations and so on. Therefore, the macro frequency layer (e.g. frequency layer f1) provides continuous coverage across the deployment area while the pico frequency layer (e.g. frequency layer f2) is used for offloading purpose (hotspots) especially in densely populated areas. As depicted in FIG. 2, the current measurement gap cycle 201 has the periodicity of 40 ms or 80 ms and measurement gap 202 is 6 ms. The currently defined gap pattern was originally designed for mobility of users within a macro cell only deployment scenario for the purpose of coverage and facilitating mobility as compared to the HetNet deployments where the purpose is offloading opportunity.

Figures 3, 4:
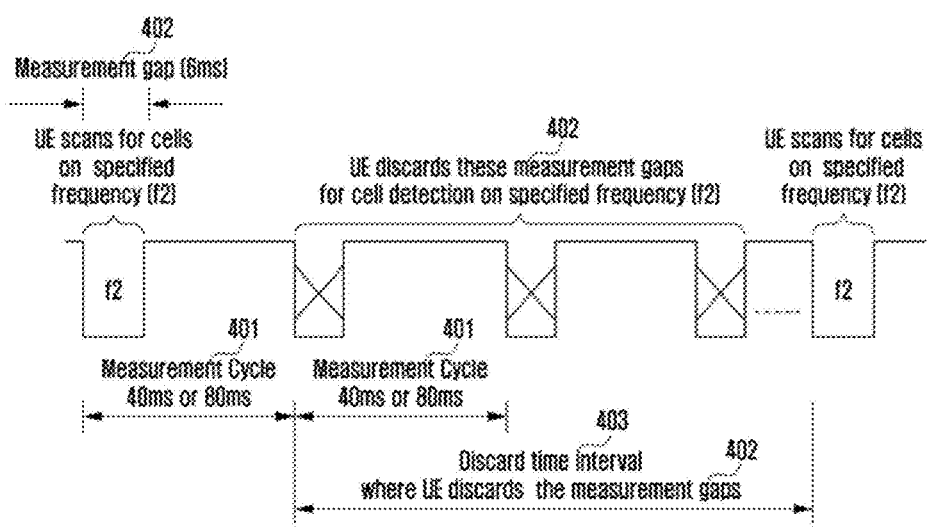
FIG. 3 illustrates the inter-frequency cell detection performance requirement according to TS 36.133, according to the embodiments as disclosed herein.
FIG. 4 illustrates a relaxed cell detection by the user equipment wherein some measurement gaps are discarded, according to the embodiments as disclosed herein.

FIG. 3 illustrates the inter-frequency cell detection performance requirement according to TS 36.133, according to the embodiments as disclosed herein. According to the table depicted in FIG. 3 the cell detection delay puts a requirement on the UE with respect to how often to look for new cells. E.g. if the UE is in non-DRX with a 40 ms measurement gap periodicity and scanning on one inter-frequency (FDD-FDD) other than the serving frequency then approximately 4 s cell detection requirement applies. Similarly the requirement to identify a newly detectable FDD inter-frequency cell when the UE is in non-DRX with a 80 ms measurement gap pattern is approximately 8 seconds. The cell detection time requirement increase as the number of frequencies configured for inter-frequency cell scanning increases. The time requirements depicted in the table of FIG. 3 are therefore normal cell detection requirements. A typical configuration of the relaxed cell identification delay in several seconds. With the relaxed cell detection indication the UE 100 is not expected to meet the normal inter-frequency cell detection performance requirements as depicted in table of FIG. 3 and specified in TS 36.133.

According to the table in FIG. 3, it can be inferred for detecting an inter-frequency FDD cell with the measurement periodicity as 40 ms, then for scanning one inter-frequency FDD cell the identified delay is 3.84 seconds without Discontinuous Reception (DRX) is not applicable the relaxed detection indication is provided to the UE 100 along with relaxed cell identification requirement for example as 10 seconds. The UE 100 is expected to detect one inter-frequency FDD cell within 10 seconds and not 3.84 s, when the relaxed detection is provided to the UE 100 by the serving cell.

In an embodiment, the relaxed or slower detection indication can be indicated to the UE in a manner as described herein.

Max (RRC configured value, requirement according to TS 36.133 i.e. table in FIG. 3) when the "relaxed or slow detection allowed" indicator is true.

Min (RRC configured value, requirement according to TS 36.133 i.e. table in FIG. 3) when the "relaxed or slow detection allowed" indicator is false.

Where the RRC configured value denotes the cell identification time that is configured when relaxed cell detection is desirable.

After a cell has been detected, there are performance requirements on measurement accuracy and measurement reporting delay. For example, if the UE is configured with another frequency (f2) for cell scanning other than the serving frequency (f1), once the inter-frequency cell is detected the delay in reporting measurements of the detected cell when crossing a certain threshold is 480 ms. The serving cell should only configure normal measurement gaps for a UE when it also has the intention to offload the UE 100 to the inter-frequency cell when detected. With the normal measurement gap, the UE will typically extensively scan on inter-frequency layer (f2) to detect small cells and once it is detected the UE will typically not be measuring extensively on detected inter-frequency small cell before a handover is triggered. Hence, considerable amount of power is consumed for detecting the inter-frequency cell. However, once the inter-frequency cell is detected, the RSRP and/or RSRQ measurements, which are reported leading to handover, do not consume significant power. Therefore, there is no need to relax the performance requirements on measurement accuracy and measurement reporting delay of the detected inter-frequency cell.

In an embodiment, the relaxed cell detection indication is associated with a set of specified parameters such as relaxed time duration for cell detection, cell detection time scaling factor, discrete measurement parameters and measurement bandwidth. Further, the relaxed time duration is used for specifying relaxation in the cell detection time that is allowed for the UE on the specified frequency compared to the normal cell detection time requirement.

In an embodiment, the performance requirements for measurement accuracy and measurement reporting of the detected inter-frequency cell as specified in TS 36.133 are not relaxed.

The scaling factor associated with the relaxed detection indication represents a multiplying factor to the normal cell detection time for achieving the relaxation in cell detection time for the UE on the specified frequency.

In an embodiment, when relaxed cell detection time is not provided explicitly to the UE, then this scaling factor is multiplied to normal cell detection time to implicitly derive the relaxed cell detection time.

Further, the measurement bandwidth is used for specifying channel bandwidth used for the cell detection by the UE on specified frequency, during discrete scanning for the cells using said normal measurement gaps.

When specifying the relaxed detection, the sampling accuracy of the signals has to be maintained. Typically, for better accuracy, large number of samples is better or the network can provide larger measurement bandwidth. The UE can perform cell detection across the larger measurement bandwidth for better accuracy with less number of samples in time domain. In an embodiment, for better sampling accuracy the UE can perform discrete measurements using larger measurement bandwidth. For performing discrete measurements by the UE, the serving cell can configure the parameters such as measurement interval and the measurement period.

FIG. 4 illustrates relaxed cell detection by the user equipment wherein some measurement gaps are discarded, according to the embodiments as disclosed herein. Initially, the UE 100 receives a relaxed cell detection indication for a specified frequency from a serving cell in the heterogeneous network. The specified frequency is typically the frequency on which the pico cells are deployed. However, this may not be the limiting case.

In an embodiment, the UE 100 receives the relaxed cell detection indication in a system information message (a broadcast message) or in a dedicated message. The dedicated message can be a layer 2 message, layer 3 message or a new message. For example, when dedicated message is used then the relaxed cell detection indication can be included in the measurement object, namely measObject-EUTRA which provides measurement parameters specific to a configured frequency.

In an embodiment, the serving cell along with relaxed cell detection indication provides the cell identification time. The cell identification time (configured by the serving cell), defines the delay or relaxation, the UE 100 is expected to detect the inter-frequency cell using the relaxed detection method for the specified frequency.

In an embodiment, the relaxed cell identification time is implicitly derived by the UE from the normal cell detection time as indicated by the serving cell. With this relaxed method a delay is expected in the inter-frequency cell detection as compared to normal cell detection time requirement. Thus, the cell identification time provided along with the relaxed cell detection indication provides the relaxed cell detection time requirement which is longer than the normal cell detection time requirement.

The UE 100 performs discrete scanning for inter-frequency cells on the specified frequency (e.g. frequency f2) indicated by the serving cell operating on frequency (e.g. frequency f1) in the heterogeneous network. During inter-frequency cell detection on specified frequency (f2), the UE 100 discards some normal measurement gaps 402 depicted as cross marks in FIG. 4. The battery power of the UE 100 is only consumed when the UE is scanning the frequency (e.g. f2) within the measurement gap 402 which is not discarded. Therefore, the battery power of the UE 100 is not consumed when UE 100 discards some normal measurement gaps 402 in the measurement gap pattern for detecting the inter-frequency cell (s) on the specified frequency (e.g. f2). Further, the UE 100 performs the scanning of the frequency during the measurement gap after some time. In one embodiment, the time when UE 100 shall use the measurement gap 402 after discarding some of the measurement gap cycles 401. The discarding of measurement gaps 402 can be left to the implementation of UE 100. Alternately, the discard time interval 403 can be provided by the serving cell along with the relaxed cell detection indication and cell identification time for the specified frequency. In this way, the battery power consumption of the UE 100 can be minimized by using the discrete scanning method for relaxed cell detection as described above. When performing the discrete scanning method the UE 100 can optionally use a larger channel bandwidth for better sampling accuracy with less number of samples in time domain. The advantage of the above disclosed method is it is simple and there is no need for new measurement gap pattern with long periodicity. The existing normal measurement gap patterns can be used for discrete scanning for a specified frequency associated with the relaxed cell detection indication.

The UE 100 upon detecting the inter-frequency cell on the specified frequency within the relaxed time duration or cell identification time deactivates the relaxed detection indication. Further, the UE 100 performs continuous measurements of RSRP and/or RSRQ of the detected inter-frequency cell using all the normal measurement gaps. The UE 100 performs these RSRP and/or RSRQ measurements with normal performance requirements.

Consider that there exists two frequencies (namely, f2 and f3) configured by the serving cell (other than the serving frequency f1) to the UE 100 for performing inter-frequency cell detection. Among the two frequencies, the serving cell specifies the relaxed detection indication for one frequency (say for example f2) on which small cells (for example pico cells) are deployed. In this case, the relaxed detection indication is provided to the UE 100 for frequency f2 and the serving cell may also provide the relaxed detection time or cell identification time, within which the UE 100 has to detect the inter-frequency cell(s) on f2. For the other frequency f3 normal cell detection requirement applies. In an example, consider that the relaxed detection time provided to the UE by the serving cell for frequency f2 is 50 seconds. The UE 100 has to identify an inter-frequency cell on f2 within the 50 seconds. The UE 100 upon detecting the inter-frequency cell on the specified frequency within the relaxed time duration or cell identification time deactivates the relaxed detection indication. Further, the UE 100 performs continuous measurements of RSRP and RSRQ of the detected inter-frequency cell using all the normal measurement gaps to facilitate offloading to the detected inter-frequency cells.

In a typical UE 100 implementation the configured measurement gaps 402 shown in FIG. 4 are used alternately for scanning configured frequencies f2 and f3. The UE 100 scans the cells on the frequency f3 in the measurement gaps used for frequency f3 whereas the UE 100 discards some of the measurement gaps 402 for scanning the cells on the frequency f2. Further, the UE 100 scans the cells on f2 after the discard time interval 403, thereby minimizing the battery power consumption of the UE 100.

Figure 5:
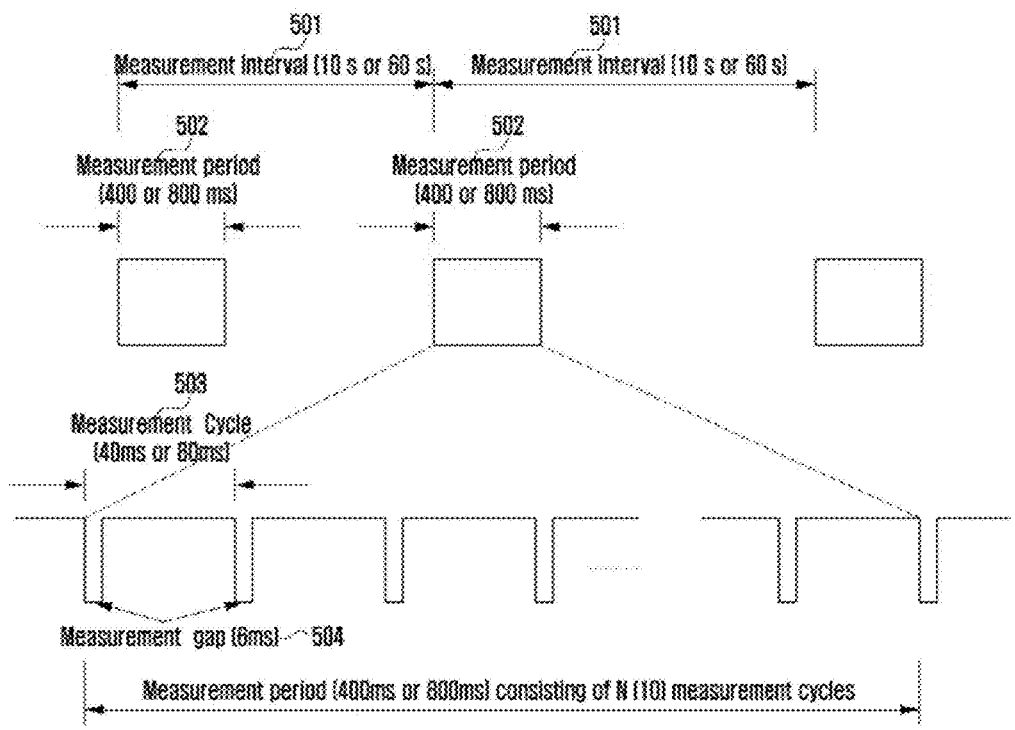
FIG. 5 illustrates the inter-frequency cell detection by the UE using discrete measurement parameters, according to the embodiments as disclosed herein.

FIG. 5 illustrates the inter-frequency cell detection by the UE using discrete measurement parameters, according to the embodiments as disclosed herein. Initially, the UE 100 receives the relaxed cell detection indication for a specified frequency from a serving cell in the heterogeneous network. The specified frequency is typically the frequency on which the pico cells are deployed. However, this may not be the limiting case.

The relaxed cell detection indication is associated with discrete measurement parameters and measurement bandwidth. For performing discrete measurements, the serving cell can configure the UE 100 with parameters such as measurement interval and the measurement period which allows the relaxation of cell detection time requirement.

Further, the UE 100 initiates the relaxed cell detection on specified frequency using the discrete measurement parameters such as measurement period and measurement interval associated with the relaxed detection indication.

In an embodiment, the UE 100 performs the continuous scanning for inter-frequency cells using normal measurement gaps during the start time of the measurement interval 501 (e.g. 10 seconds or 60 seconds) and within the measurement period 502 (e.g. 400 ms or 800 ms) as shown in FIG. 5.

For example, the UE 100 performs the continuous scanning for inter-frequency cells during the start time of the measurement interval 501, which is 10 seconds or 60 seconds. Further, the UE 100 performs the scanning for cells on the specified frequency (e.g. frequency f2) during the measurement period 502 using all the normal measurement gaps 504 as shown in the FIG. 5. The measurement period 502 consists N measurement cycles 503. The UE 100 performs scanning for cells on the specified frequency (e.g. frequency f2) during all the normal measurement gaps 504 of the N measurement cycles 503. The measurement period 502 can be specified in terms of number of measurement cycles 503.

In an embodiment, the UE 100 discards normal measurement gaps for scanning inter-frequency cells on the specified frequency, after expiry of the measurement period 502 (e.g. 400 ms or 800 ms) in the measurement interval 501 (e.g. 10 seconds or 60 seconds). The measurement cycles 503 after the expiry of the measurement period 502 are discarded by the UE for scanning cells on the specified frequency until the start of the next measurement interval 501 if cell(s) are not detected on the specified frequency. Further, if the cell on specified frequency (f2) was not detected during the previous measurement interval 501, the UE 100 repeats the continuous scanning for cell detection on the specified frequency during the measurement period 502 in the next measurement interval 501 until an inter-frequency cell is detected on the specified frequency. The discrete measurement parameters such as measurement period and measurement interval are configured by the serving cell such that the UE is able to detect cell(s) on specified frequency with a relaxed cell detection time requirement. In this way the UE battery power consumption is minimized for inter-frequency cell detection using the normal measurement gaps with discrete scanning method as described above with relaxed cell detection time requirement. When performing the discrete scanning method the UE 100 can optionally use a larger channel bandwidth for better sampling accuracy with less number of samples in time domain.

After a cell is detected on the specified frequency, the UE 100 deactivates the relaxed detection indication. Further, the UE 100 performs continuous measurements of RSRP and/or RSRQ of the detected inter-frequency cell using all the normal measurement gaps. Therefore, the performance requirements for measurement accuracy and measurement reporting as specified in TS 36.133 are not relaxed. The UE 100 performs these RSRP and/or RSRQ measurements with normal performance requirements.

Figure 6:
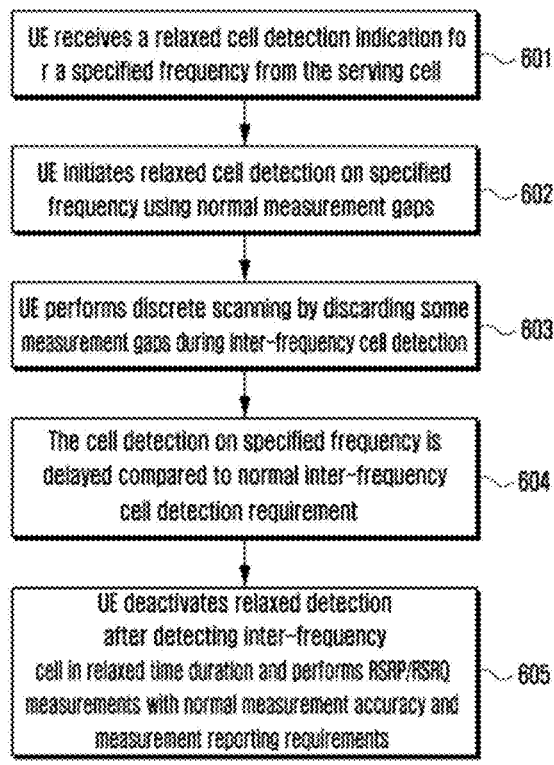
FIG. 6 illustrates a flow diagram explaining the various steps involved in detecting the inter-frequency cell with relaxed cell detection requirement for minimizing the battery power consumption of the UE, according to the embodiments as disclosed herein.

FIG. 6 illustrates a flow diagram explaining the various steps involved in detecting the inter-frequency cell with relaxed cell detection requirement for minimizing the battery power consumption of the UE, according to the embodiments as disclosed herein.

As depicted in the flow diagram 600, initially, the UE 100 receives (601) the relaxed cell detection indication for specified frequency from the serving cell.

In an embodiment, the UE 100 receives the relaxed detection indication from the serving cell in a dedicated message or a System Information (SI) message. Further, the dedicated message or the SI message from the serving cell specifies the frequency for which the relaxed detection is applicable. For example, when dedicated message is used then the relaxed cell detection indication can be included in the measurement object, namely measObjectEUTRA which provides measurement parameters specific to a configured frequency.

Further, the UE 100 initiates (602) the relaxed cell detection on the specified frequency using the normal measurement gaps.

In an embodiment, the relaxed detection indication indicates the UE 100 to initiate the cell detection on the specified frequency using normal measurement gaps by relaxing the time requirement for detecting inter-frequency cells in the heterogeneous network. The UE 100 performs (603) discrete scanning by discarding some normal measurement gaps during inter-frequency cell detection on the specified frequency as shown in FIG. 4. Further the cell detection on specified frequency is delayed (604) compared to normal inter-frequency cell detection requirement. Some normal measurement gaps 402 for scanning the inter-frequency cells on the specified frequency are discarded by the UE 100 as described in FIG. 4. Further, the UE 100 initiates the scanning of the inter-frequency cells after some time (discard time interval 403) as indicated by the serving cell, thereby minimizing the battery power consumption.

The UE 100 deactivates (605) the relaxed detection indication after detecting the inter-frequency cell in relaxed time duration on the specified frequency. Further, the UE 100 performs continuous measurements of RSRP and/or RSRQ of the detected inter-frequency cell using all the normal measurement gaps.

In an embodiment, the UE 100 performs the RSRP and RSRQ measurements with normal measurement accuracy and measurement reporting requirements.

The various actions in flow diagram 600 may be performed in the order presented, in a different order or simultaneously. Further, in some embodiments, some actions listed in FIG. 6 may be omitted.

Figure 7:
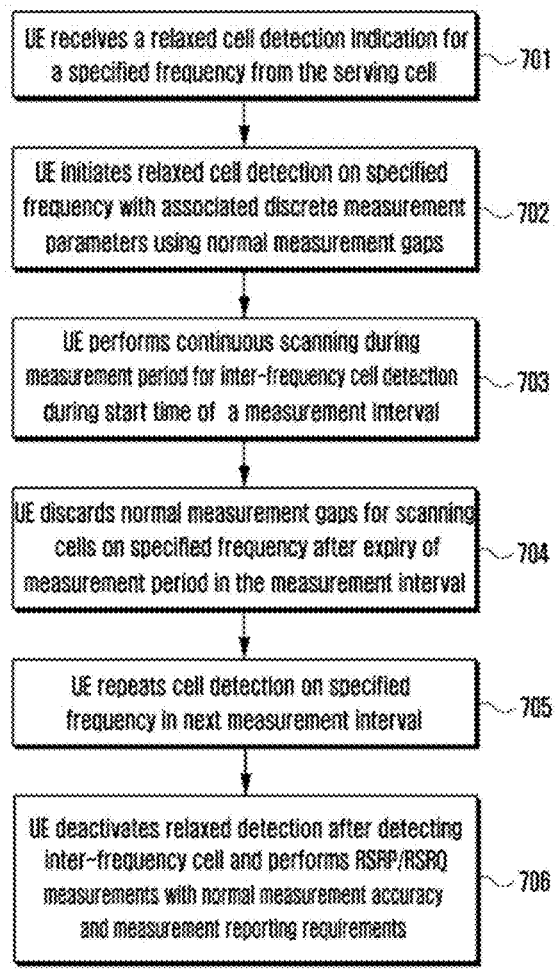
FIG. 7 illustrates the flow diagram explaining the various steps involved in detecting inter-frequency cell using relaxed cell detection requirement by applying discrete measurement parameters, according to the embodiments as disclosed herein.

FIG. 7 illustrates the flow diagram explaining the various steps involved in detecting inter-frequency cell using relaxed cell detection requirement by applying discrete measurement parameters, according to the embodiments as disclosed herein. As depicted in the flow diagram 700, initially, the UE 100 receives (701) the relaxed detection indication for a specified frequency from the serving cell.

The UE 100 initiates (702) the relaxed detection on the specified frequency with associated discrete measurement parameters using the normal measurement gaps. The discrete measurement parameters associated with the relaxed detection indication includes but not limited to measurement interval 501 and measurement period 502 as described in FIG. 5. In an embodiment, the serving cell provides the measurement interval 501 and the measurement period 502 along with the relaxed detection indication.

Further, the UE 100 performs (703) continuous scanning during measurement period 502 for the inter-frequency cell detection using the normal measurement gaps during the start time of the measurement interval 501 and within the measurement period 502 as shown in FIG. 5.

Further, the UE 100 discards (704) the normal measurement gaps 504 for scanning cells on the specified frequency within the measurement interval after expiry of the measurement period 502 in the measurement interval 501. The measurement cycles 503 after the expiry of the measurement period 502 are discarded by the UE 100 for scanning cells on the specified frequency until the start of the next measurement interval if cell(s) are not detected on the specified frequency.

Further, the UE 100 repeats (705) cell detection on the specified frequency in the next measurement interval 501, if the cell on specified frequency was not detected during the previous measurement interval 501 as depicted in FIG. 5.

Once an inter-frequency cell is detected on the specified frequency, the UE 100 deactivates (706) the relaxed detection indication. Further, the UE 100 performs continuous measurements of RSRP and/or RSRQ of the detected inter-frequency cell using all the normal measurement gaps.

In an embodiment, the UE 100 performs the RSRP and RSRQ measurements with normal measurement accuracy and measurement reporting requirements.

In an embodiment, the serving cell provides a signal strength threshold to the UE 100 for specified frequency to which the relaxed cell detection is applicable. Further, the RSRP and RSRQ measurements are compared with the signal strength threshold provided to the UE 100, before the UE 100 sends a measurement report to the serving cell.

When the UE 100 sends the measurement report, the serving cell decides to handover the UE 100 to the detected cell.

The various actions in flow diagram 700 may be performed in the order presented, in a different order or simultaneously. Further, in some embodiments, some actions listed in FIG. 7 may be omitted.

Figure 8:
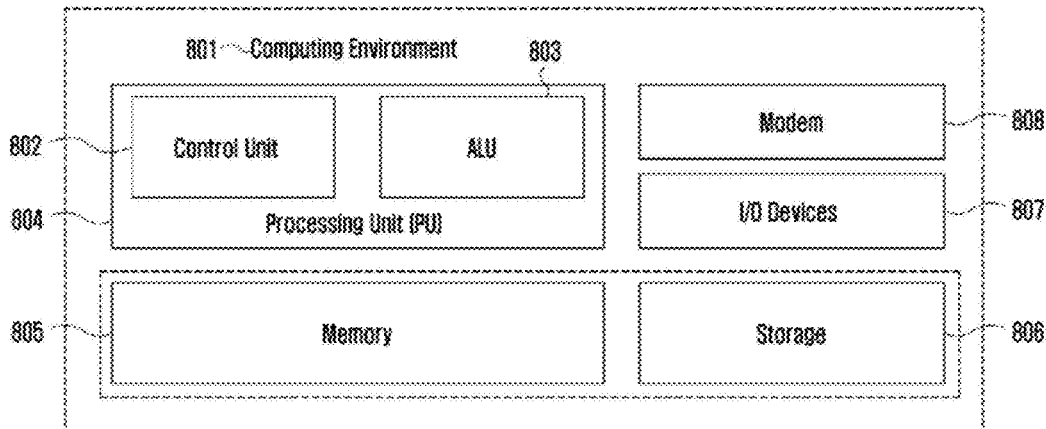
FIG. 8 illustrates a computing environment implementing the method and system for minimizing the battery power consumption during inter-frequency cell detection, according to the embodiments as disclosed herein.

FIG. 8 illustrates a computing environment implementing the method and system for minimizing the battery power consumption during inter-frequency cell detection, according to the embodiments as disclosed herein. As depicted the computing environment 801 comprises at least one processing unit 804 that is equipped with a control unit 802 and an Arithmetic Logic Unit (ALU) 803, a memory 805, a storage unit 806, plurality of Modem 808 and a plurality Input output (I/O) devices 807. The processing unit 804 is responsible for processing the instructions of the algorithm. The processing unit 804 receives commands from the control unit in order to perform its processing. Further, any logical and arithmetic operations involved in the execution of the instructions are computed with the help of the ALU 803.

The overall computing environment 801 can be composed of multiple homogeneous and/or heterogeneous cores, multiple CPUs of different kinds, special media and other accelerators. The processing unit 804 is responsible for processing the instructions of the algorithm. Further, the plurality of processing units 404 may be located on a single chip or over multiple chips.

The algorithm comprising of instructions and codes required for the implementation are stored in either the memory unit 805 or the storage 806 or both. At the time of execution, the instructions may be fetched from the corresponding memory 805 and/or storage 806, and executed by the processing unit 804.

In case of any hardware implementations various modem 808 or external I/O devices 807 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 and 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for measuring a signal by a user equipment (UE) in a wireless communication system, the method comprising:
    receiving, from a base station, a message including configuration information;
    identifying whether the configuration information includes information indicating that a specific frequency is configured for reduced measurement performance;
    measuring, on the specific frequency, a signal during a first time period associated with the reduced measurement performance, in case that the configuration information includes the information; and
    measuring, on the specific frequency, the signal during a second time period associated with normal measurement performance, in case that the configuration information does not include the information,
    wherein the first time period is determined based on a scaling factor used to scale measurement performance for the specific frequency.

2. The method of claim 1, wherein the second time period associated with the normal measurement performance is determined based on a discontinuous reception (DRX) cycle length and a gap period.

3. The method of claim 1, wherein the UE detects inter-frequency cells on the specified frequency based on the reduced measurement performance.

4. The method of claim 3, wherein a cell detection for the inter-frequency cells on the specified frequency is delayed as compared to normal cell detection time requirement associated with the normal measurement performance.

5. A method for transmitting information by a base station in a wireless communication system, the method comprising:
    generating information indicating that a specific frequency is configured for reduced measurement performance;
    determining whether configuration information includes the information; and
    transmitting, to a user equipment (UE), a message including the configuration information according to the determination,
    wherein a signal is measured during a first time period associated with the reduced measurement performance in case that the configuration information includes the information,
    wherein the signal is measured during a second time period associated with normal measurement performance in case that the configuration information does not include the information, and
    wherein the first time period is determined based on a scaling factor used to scale measurement performance for the specific frequency.

6. The method of claim 5, wherein the second time period associated with the normal measurement performance is determined based on a discontinuous reception (DRX) cycle length and a gap period.

7. The method of claim 5, wherein inter-frequency cells on the specified frequency is detected based on the reduced measurement performance.

8. The method of claim 7, wherein a cell detection for the inter-frequency cells on the specified frequency is delayed as compared to normal cell detection time requirement associated with the normal measurement performance.

9. A user equipment (UE) in a wireless communication system, the UE comprising:
    a transceiver; and
    a controller coupled with the transceiver and configured to control to:
        receive, from a base station, a message including configuration information,
        identify whether the configuration information includes information indicating that a specific frequency is configured for reduced measurement performance,
        measure, on the specific frequency, a signal during a first time period associated with the reduced measurement performance, in case that the configuration information includes the information, and
        measure, on the specific frequency, the signal during a second time period associated with normal measurement performance, in case that the configuration information does not include the information,
    wherein the first time period is determined based on a scaling factor used to scale measurement performance for the specific frequency.

10. The UE of claim 9, wherein the second time period associated with the normal measurement performance is determined based on a discontinuous reception (DRX) cycle length and a gap period.

11. The UE of claim 9, wherein the UE detects inter-frequency cells on the specified frequency based on the reduced measurement performance.

12. The UE of claim 11, wherein a cell detection for the inter-frequency cells on the specified frequency is delayed as compared to normal cell detection time requirement associated with the normal measurement performance.

13. A base station in a wireless communication system, the base station comprising:
    a transceiver; and
    a controller coupled with the transceiver and configured to control to:
        generate information indicating that a specific frequency is configured for reduced measurement performance,
        determine whether configuration information includes the information; and
        transmit, to a user equipment (UE), a message including the configuration information according to the determination,
    wherein a signal is measured during a first time period associated with the reduced measurement performance in case that the configuration information includes the information,
    wherein the signal is measured during a second time period associated with normal measurement performance in case that the configuration information does not include the information, and wherein the first time period is determined based on a scaling factor used to scale measurement performance for the specific frequency.

14. The base station of claim 13, wherein the second time period associated with the normal measurement performance is determined based on a discontinuous reception (DRX) cycle length and a gap period.

15. The base station of claim 13, wherein inter-frequency cells on the specified frequency is detected based on the reduced measurement performance.

16. The base station of claim 15, wherein a cell detection for the inter-frequency cells on the specified frequency is delayed as compared to normal cell detection time requirement associated with the normal measurement performance.

* * * * *